(12) United States Patent
Tang et al.

(10) Patent No.: US 6,818,863 B1
(45) Date of Patent: Nov. 16, 2004

(54) ELECTRIC HEAT SEALING APPARATUS

(75) Inventors: Ai-Ming Tang, Tucheng (TW); Ming Huang, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 10/627,662

(22) Filed: Jul. 28, 2003

(51) Int. Cl.[7] ................................................ H05B 3/00
(52) U.S. Cl. ...................... 219/243; 156/515; 156/251; 156/583.1; 219/521
(58) Field of Search ................................ 219/243, 521; 156/583.1, 583.2, 251, 499, 515

(56) References Cited

U.S. PATENT DOCUMENTS

| | | | | |
|---|---|---|---|---|
| 2,638,964 A | * | 5/1953 | Andina ........................ 100/321 |
| 3,144,372 A | * | 8/1964 | Peterson et al. ............ 156/251 |
| 3,346,435 A | * | 10/1967 | Beck ........................... 156/423 |
| 3,383,260 A | * | 5/1968 | Mojonnier ................... 156/156 |
| 3,520,755 A | * | 7/1970 | Raffaelli et al. .......... 156/380.7 |
| 3,657,055 A | * | 4/1972 | Nichols ..................... 156/583.4 |
| 3,682,748 A | * | 8/1972 | Kimball ...................... 156/499 |
| 5,997,684 A | * | 12/1999 | Kusz .......................... 156/290 |
| 6,254,707 B1 | * | 7/2001 | Sfikas et al. ............... 156/73.3 |

* cited by examiner

*Primary Examiner*—John A. Jeffery
(74) *Attorney, Agent, or Firm*—Rosenberg, Klein & Lee

(57) ABSTRACT

The present invention provides an electric heat sealing apparatus which comprises an upper support board, a lower support board and a lateral board which define a moving space therebetween. A sealing plate is placed in the moving space and can be driven by a set of drivers to move vertically in the space. A sealing portion and a cutting portion extent downwardly from a rim of the sealing plate and a narrow groove is formed therebetween. On the course of packing, plastic films can be sealed and cut simultaneously owing to a vertical movement of the cutting and the sealing portions. Further, a neat and airtight sealing effect can be achieved due to the design of the narrow groove.

14 Claims, 3 Drawing Sheets

ELECTRIC HEAT SEALING APPARATUS

BACKGROUND OF THE INVENTION

1. Field of the Invention

The present invention relates generally to an electric heat sealing apparatus packaging articles with plastic films, and more especially to an electric heat sealing apparatus which proceeds a cutting process together with a sealing process, thereby a neat and airtight package effect is achieved.

2. The Related Art

Electric heat sealing apparatuses have an extensive application in the field of plastic packaging. Most often an electric heating wire is employed in a traditional electric heat sealing apparatus to seal articles with plastic film. However, the traditional electric heat sealing apparatus has two serious drawbacks. Firstly, after sealing process, remains of the package material can't be cut simultaneously. Secondly, although the electric heating wire can be bent into multi-shapes to meet different sealing shape demands, there always remains an unsealed gap along the seal as the bent electric heating wire isn't able to form a complete airtight configuration.

Another traditional electric heat sealing apparatus makes an improved design in order to overcome the drawbacks above mentioned. The traditional electric heat sealing apparatus provides a sealing member with an electric heating tube therein. A heating ring is formed in a rim of the sealing member, and a cutting ring extends downwardly from an exterior edge of the heating ring. On the course of packing, the plastic film is sealed by the heating ring and cut simultaneously by the cutting ring. The second traditional electric heat sealing apparatus also has several drawbacks. Due to plastic contractibility, the package appearance tends to wrinkle and leakage may occur from the seal. Meanwhile, because the plastic films at the seal and the cut are heated together, a temperature of the plastic film at the cut maybe so high that an excessive deformation of the plastic film will result. With the result that it is very difficult to cut the plastic film smoothly, even more seriously, the plastic film adheres to the cutting ring.

SUMMARY OF THE INVENTION

Thus, an objection of the present invention is to provide an electric heat sealing apparatus which has a seal-cut portion. The seal-cut portion has a sealing portion and a cutting portion which form a narrow groove therebetween. On the course of packing, the seal-cut portion seals and cuts the plastic films simultaneously thereby a neat and airtight package effect may be achieved.

To attain the above object, the present invention provides an electric heat sealing apparatus which comprises a lower support board, an upper support board and a lateral board. The upper support board is arranged above the lower support board. The lateral board is located between the lower and the upper support board with a moving space formed therebetween. A receiving board is fixed on a top face of the lower support board. The receiving board forms a receiving hole. A tray is received in the receiving hole. A lower driver is fixed on a bottom face of the lower support board, passing through the lower support board and engaging with the tray so as to drive the tray moving up and down. A sealing plate is arranged in the moving space. A seal-cut portion extends downwardly from a rim of the sealing plate which forms an opened recess surrounded by the seal-cut portion. The seal-cut portion comprises a sealing portion and a cutting portion which define a narrow groove therebetween. An upper driver is fixed on a top face of the upper support board, passing through the upper support board and engaging with the sealing plate in order to drive the sealing plate moving up and down in the moving space.

In packaging, the sealing plate is heated to arrive at a predetermined temperature by an exterior power source. The heated sealing plate is then driven by the upper driver to move downwardly to press on the article placed on the tray and then the plastic film covered on the article is sealed by the sealing portion and cut simultaneously by the cutting portion.

As mentioned above, the electric heat sealing apparatus of the present invention takes an improved configuration which provides a sealing portion, a cutting portion and a narrow groove therebetween. Thereby, the plastic films can be cut smoothly together with tightly seated process. Further a neat and airtight package effect is achieved, and a convenient and secure operation is provided by the present invention.

BRIEF DESCRIPTION OF THE DRAWINGS

A detailed explanation of a preferred embodiment of the present invention will be given, with reference to the attached drawings, for better understanding thereof to those skilled in the art.

DETAILED DESCRIPTION OF THE PREFERRED EMBODIMENT

Figure 1:
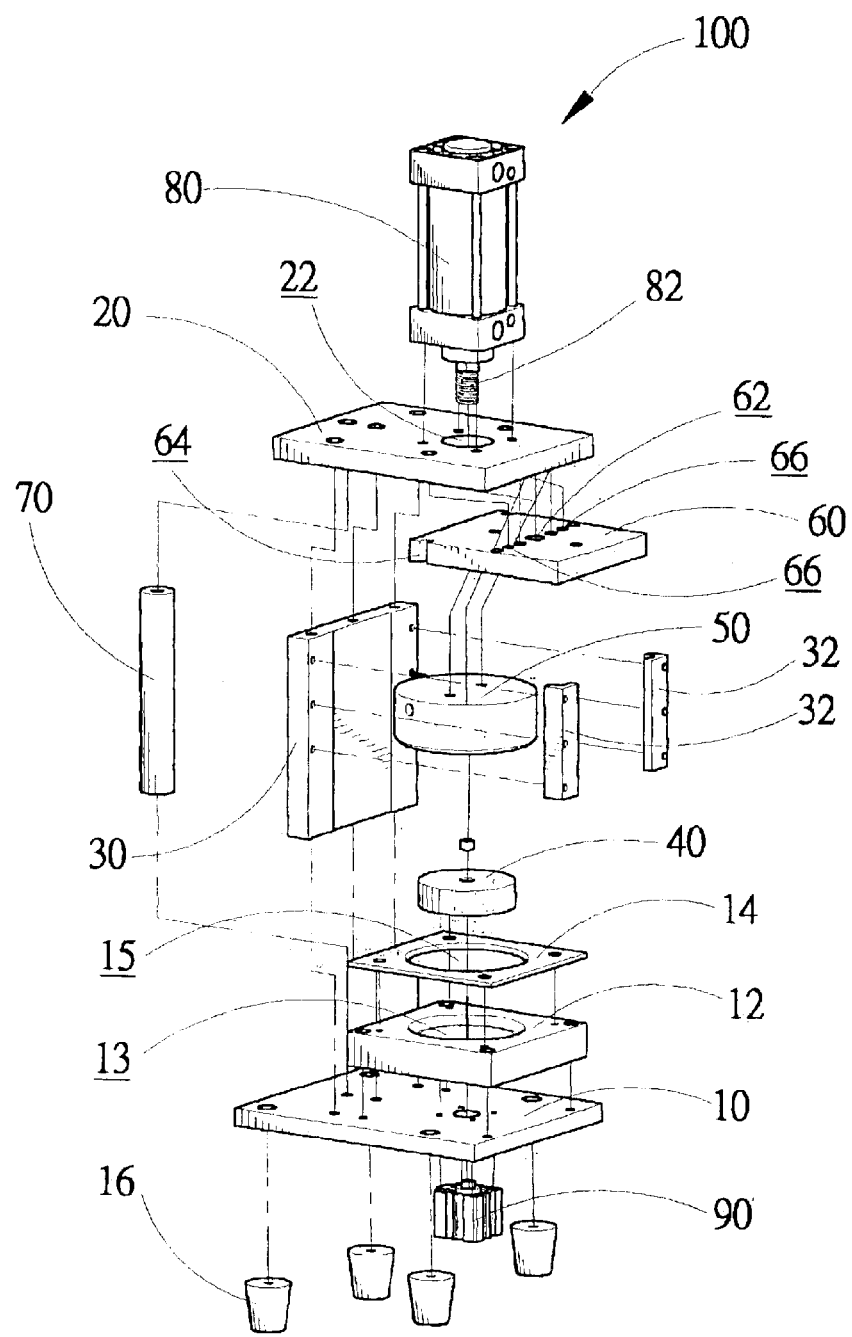
FIG. 1 is an exploded view of an electric heat sealing apparatus in accordance with the present invention.
Figure 2:
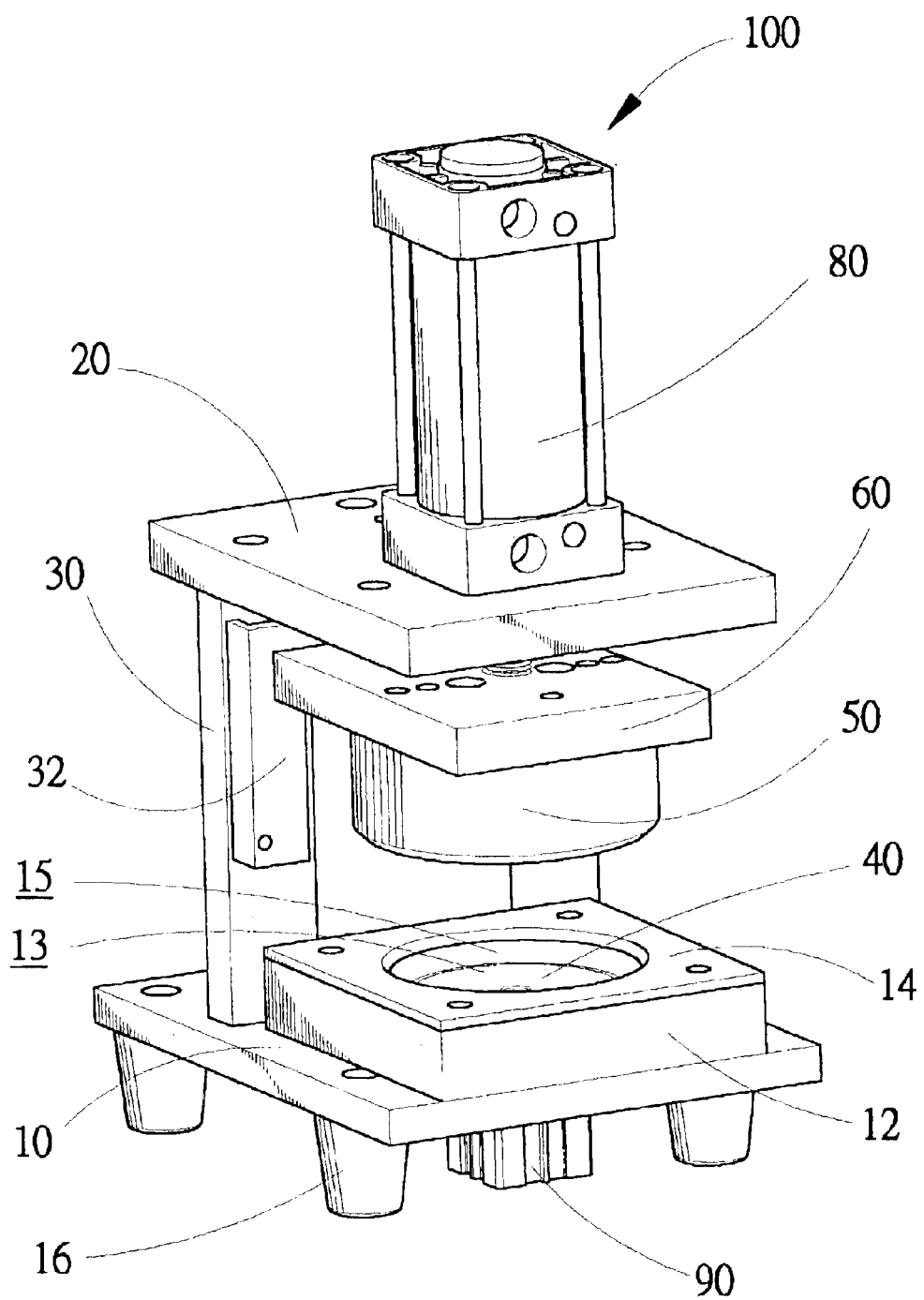
FIG. 2 is a perspective view of the electric heat sealing apparatus shown in FIG. 1.

With reference to the FIGS. 1 and 2, an electric heat sealing apparatus, in accordance with the present invention, generally designed with reference numeral 100, comprises a lower support board 10, an upper support board 20, and a lateral board 30. The lateral board 30 is located between the lower and the upper support boards 10, 20 of which one end is fixed on a bottom face of the upper support board 20 and the other opposite end is fixed on a top face of the lower support board 10. A plurality of pads 16 are placed under a bottom face of the lower support board 10 in order to steady the electric heat sealing apparatus 100 on a manipulation platform. A receiving board 12 is fixed on the top face of the lower support board 10. A temperature resistance board 14 is located on the receiving board 12 in order to protect the receiving board 12 from being deformed under high temperature. A support pillar 70 and a pair of guide boards 32 are arranged respectively in an exterior and an interior of the lateral board 30. The support pillar 70 engages with the lower support board 10 and the upper support board 20 at opposite ends to reinforce them. The guide board 32 has an L-shaped portion with a pair of sides one of which is firmly fixed to a corresponding lateral side of the lateral board 30.

The lower support board 10, the upper support board 20, and the lateral board 30 together define a moving space. A tray 40 and a sealing plate 50 can be driven by a set of drivers to move vertically in it. The set of drivers illustrated in the present invention are pneumatic-type drivers which are composed of an upper driver 80 and a lower driver 90. The upper driver 80 is fixed on a top face of the upper support board 20, and the lower driver 90 is fixed on the bottom face of the lower support board 10.

A slide board 60 is arranged in the moving space paralleled with the lower and the upper support board 10, 20 and fixed to a top face of the sealing plate 50. A pair of guide recesses 64 are opened on both opposite sides of the slide board 60 so as to receive another side of the guide boards 32 respectively. A first through hole 22 is formed in the upper support board 20 to allow a bolt 82 of the upper driver 80 passing therethrough. A positioned hole 62 is formed in the slide board 60 for engaging with the bolt 82 to fix the slide board 60 to the upper driver 80. When the upper driver 80 drives the slide board 60 moving up and down in the moving space, the sealing plate 50 can be brought to move up and down by the slide board 60 simultaneously.

The receiving board 12 and the temperature resistance board 14 respectively form a receiving hole 13 and a second through hole 15. The tray 40 is received in the receiving hole 13. An article to be packaged with plastic film covered thereon is placed on the tray 40. The lower driver 90 engages to a bottom face of the tray 40 so as to drive the tray 40 to pass through the second through hole 15 and move up and down.

Figure 3:
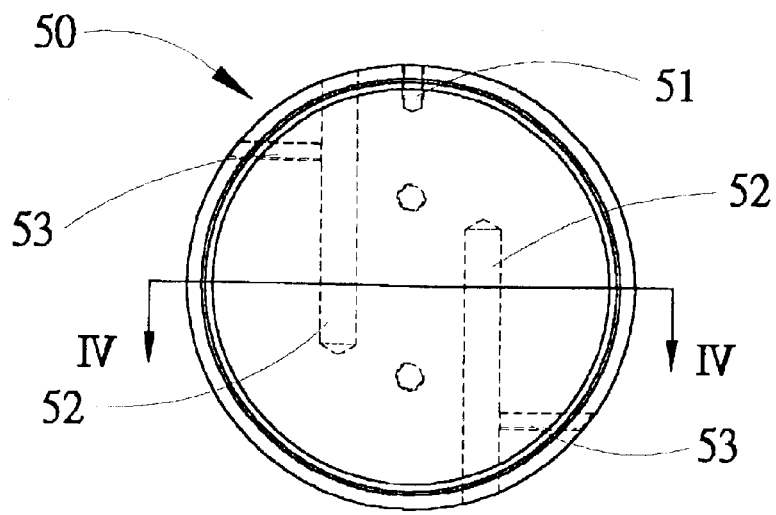
FIG. 3 is a bottom plan view of a sealing plate utilized in the electric heat sealing apparatus shown in FIG. 1.

Referring now to FIG. 3, at least one first, one second and one third assemble holes 51, 52, 53 are opened along a rim of the sealing plate 50. Two second assemble holes 52 illustrated in this embodiment are arranged in centrosymmetry, heating tubes which heat the sealing plate 50 to a predetermined temperature are placed therein. The first assemble hole 51 is used to receive temperature sensor members which sensor an actuality temperature of the sealing plate 50 and transmit it to an exterior temperature control circuit. In this illustrated embodiment, the first assemble hole 51 is parallel with the second holes 52. The third assemble holes 53 are communicated with and perpendicularly to the corresponding second assemble holes 52 respectively. Positioning posts, such as bolts, are received in the third assemble holes 53 to fixedly position the heating tubesin the second assemble holes 52.

Figure 4:
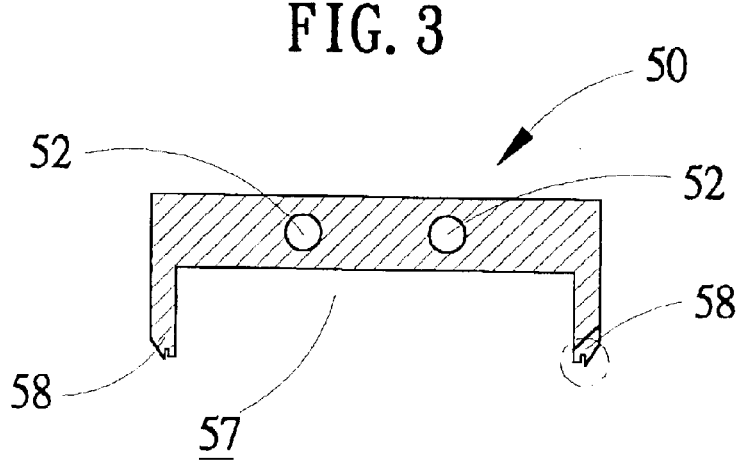
FIG. 4 is a cross-sectional view taken along line IV—IV in FIG. 3.
Figure 5:
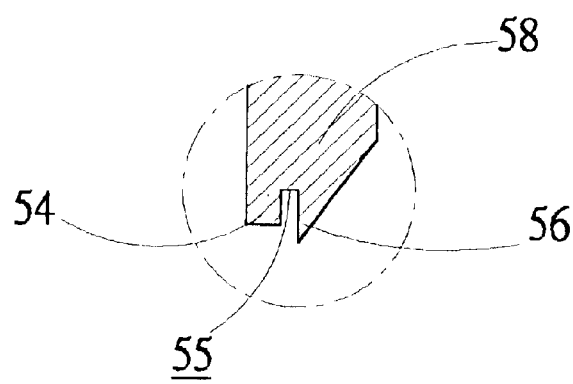
FIG. 5 is a partial enlarged view of FIG. 4.

Together referring to FIGS. 4 and 5, especially to FIG. 5, a seal-cut portion 58 is shown in detail. The seal-cut portion 58 extends downwardly from a rim of the sealing plate 50. An opened recess 57 is surrounded by the seal-cut portion 58 to provide a receiving space for an upper half of the articles. The seal-cut portion 58 comprises a sealing portion 54 and a cutting portion 56 which define a narrow groove 55 therebetween. A bottom face of the cutting portion 56 protrudes a slight longer distance than the sealing portion 54. The sealing portion 54 is located in an interior side of the seal-cut portion 58. A ring-type scaling area is formed on the bottom face of the sealing portion 54 so as to seal the plastic films with a specific width further to ensure a tight sealing effect for the articles package. The cutting portion 56 is located in an exterior side of the seal-cut portion 58. An extremely narrow bottom face of the cutting portion 56 is formed via cutting the rim of the seal-cut portion 50 along a downwardly inclined direction. During packaging, remains of the plastic films will be cut smoothly by the sharp narrow bottom face of the cutting portion 56.

Now, a working practice of the electric heat sealing apparatus 100 of the present invention is detailed below. Firstly, the upper driver 80 is controlled to drive the slide board 60 and the sealing plate 50 moving downwardly by a program control circuit including a plurality of relays. Plastic films with articles wrapped therein are placed on the temperature resistance board 14. When the sealing plate 50 reaches to the temperature resistance board 14, the sealing portion 54 seals the plastic films and the cutting portion 56 cuts remains of the plastic films simultaneously. Then, the sealing plate 50 and the slide board 60 are driven to return an initial position by the upper driver 80. After a short cooling time, the tray 40 is driven by the lower driver 90 to move upwardly so as to push the packaged article to pass through the second through hole 15 and enter the moving space. Then delaying a specific time for the purpose of taking the packaged article away conveniently, the tray 40 is driven to return an initial position by the lower driver 90. Thus a working process is finished.

In fact, because the cutting portion 56 protrudes a slight longer distance than the sealing portion 54, the cutting process starts a little earlier than the sealing process described above. But the interval time is so short that it can be ignored.

On the package process described above, in order to protect the cutting portion 56 from being damaged by repeatedly coming into contact with the temperature resistance board 14, a plastic material can be coated on the top surface of the temperature resistance board 14. The plastic coating material should have a reasonable thickness as similar to the plastic films as possible, a suitable elasticity and a superior high temperature resistance. In addition, it is necessary to ensure the bottom surface of the sealing plate 50 is parallel with the top surface of the temperature resistance board 14 so as to achieve a more reliably sealing effect. So a plurality of adjusting holes 66 can be opened in the slide board 60. Accordingly, a plurality of adjusting bolts (not shown) are assembled therein and contact tightly a top surface of the sealing plate 50. As screwing the adjusting bolts selectively, the bottom surface of the sealing plate 50 can be adjusted paralleled with the top surface of the temperature resistance board 14. Simultaneously, in order to avoid operators being scalded by the sealing plate 50, a block board (not shown) can be interlocked to an exterior side of the upper support board 20 and paralleled with the lateral board 30.

On an initiation of the sealing and cutting course described above, the plastic films will shrink in view of the plastic heat contractibility. Because the narrow groove 55 provides a shrinking space for the plastic films, a wrinkled and leaked packing effect due to the plastic heat contractibility can be avoid. Simultaneously, the narrow groove 55 provides a cooling area for the plastic films to decrease the temperature of the cutting plastic films, and a suitable cutting temperature can be achieved. Thereby problems of the prior art that the plastic films are difficult to cut and even adhere to the heating ring resulted by high temperature is avoid.

In accordance with the present invention, a selection of a manufacture material of the sealing plate 50 only tacks into account a manufacture technology. The sealing portion 54 and the cutting portion 56 should have manufactured with the sealing plate 50 as a whole in view of a manufacture precision and a service life of the sealing plate 50. There are several reasons for this. Firstly, because a thickness of the plastic films utilized in the electric heat sealing apparatus 100 is commonly 0.01 mm, a difference size between the bottom faces of the sealing portion 54 and the cutting portion 56 should be tiny, and had better to be a same quality grade. Secondly, if the plastic films can be sealed tightly and cut smoothly, the narrow groove 55 should have arrive at the most narrow thickness as possible in view of a manufacture cost, a package effect and a characteristic of the packing plastic films. Moreover, because the packing plastic films are pliable, it is not necessary to place an excessive demand on the strength of the cutting portion 56.

As mentioned previously, the electric heat sealing apparatus 100 takes an improved design which provides a sealing portion 54, a cutting portion 56 and a narrow groove 55 therebetween. Thereby the plastic films can be cut smoothly together with tightly sealed process. Further a neat and airtight package effect is achieved, and a convenient and secure operation is provided by the present invention. In addition, a shape of the sealing portion 54 and the cutting portion 56 can be changed via changing the sealing plate 50 shape. So a variety of sealing shapes can be realized by changing the shape of the sealing portion 50.

Although a particular embodiment of the invention has been described in detail for purposes of illustration, additional advantages and modifications will readily appear to those skilled in the art, and various modifications and enhancements may be made without departing from the spirit and scope of the invention. Accordingly, the invention is not to be limited except as by the appended claims.

What is claimed is:

1. An electric heat sealing apparatus comprising:

a lower support board;

an upper support board, arranged above the lower support board;

a lateral board located between the lower and the upper support board with a moving space being formed therebetween;

a receiving board fixed on a top face of the lower support board, the receiving board having a receiving hole;

a tray received in the receiving hole, an article to be packaged being placed on the tray;

a lower driver fixed on a bottom face of the lower support board, passing through the lower support board and engaging with the tray so as to drive the tray moving up and down;

a sealing plate arranged in the moving space; and an upper driver fixed on a top face of the upper support board, passing through the upper support board and engaging with the sealing plate so as to drive the sealing plate moving up and down; wherein a seal-cut portion extending downwardly from a rim of the sealing plate which forms an opened recess surrounded by the seal-cut portion, the seal-cut portion comprising a sealing portion and a cutting portion which define a narrow groove therebetween, on a course of packing, the sealing portion sealing packing material, and the cutting portion cutting remains of the packing material.

2. The electric heat sealing apparatus as claimed in claim 1, wherein the upper and the lower drivers are pneumatic-type drivers.

3. The electric heat sealing apparatus as claimed in claim 1, further comprising a temperature resistance board which is placed on the receiving board.

4. The electric heat sealing apparatus as claimed in claim 3, further comprising a plastic coating material which is coated on a top surface of the temperature resistance board, the plastic coating material has a reasonable thickness similarly to the plastic films, a suitable elasticity and a superior high temperature resistance.

5. The electric heat sealing apparatus as claimed in claim 1, further comprising a slide board which is arranged between the sealing plate and the upper support board and engaged with them respectively, so the slide board and the sealing plate can be driven together by the upper driver to move up and down in the moving space.

6. The electric heat sealing apparatus as claimed in claim 5, wherein a plurality of adjusting holes are opened in the slide board, and a plurality of adjusting bolts are assembled therein accordingly.

7. The electric heat sealing apparatus as claimed in claim 5, further comprising a guide board which is shaped to have a pair of sides, one side is firmly fixed to a corresponding lateral side of the lateral board, and the other side is engaged with the slide board so as to enable the slide board and sealing plate to slide along the side of the guide board.

8. The electric heat sealing apparatus as claimed in claim 7, wherein a guide recess is opened on a side of the slide board so as to receive the other side of the guide board.

9. The electric heat sealing apparatus as claimed in claim 1, wherein a second assemble hole is opened along a rim of the sealing plate, a heating tube which heat the sealing plate to a predetermined sealing temperature is placed therein.

10. The electric heat sealing apparatus as claimed in claim 9, wherein a first assemble hole is opened along a rim of the sealing plate and paralleled with the second hole, the first assemble hole is used to receive a temperature sensor member which sense an actual temperature of the sealing plate.

11. The electric heat sealing apparatus as claimed in claim 9, wherein a third assemble hole is communicate with and perpendicular to the second assemble hole, a positioning bolt is received in the third assemble hole to firmly position the heating tube in the second assemble hole.

12. The electric heat sealing apparatus as claimed in claim 1, wherein the sealing portion is located in an interior side of the seal-cut portion.

13. The electric heat sealing apparatus as claimed in claim 1, wherein the cutting portion is located in an exterior side of the seal-cut portion, and an extremely narrow bottom face is formed via cutting the rim of the seal-cut portion along a downward inclined direction.

14. The electric heat sealing apparatus as claimed in claim 1, further comprising a block board which is fixed to an exterior side of the upper support board paralleled with the lateral board.

\* \* \* \* \*